(12) United States Patent
Larsen

(10) Patent No.: US 8,991,427 B2
(45) Date of Patent: Mar. 31, 2015

(54) 3-WAY HIGH-PRESSURE AIR OPERATED VALVE

(75) Inventor: Todd W. Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 2057 days.

(21) Appl. No.: 12/137,905

(22) Filed: Jun. 12, 2008

(65) Prior Publication Data

US 2008/0308163 A1  Dec. 18, 2008

Related U.S. Application Data

(60) Provisional application No. 60/944,407, filed on Jun. 15, 2007.

(51) Int. Cl.
*F16K 11/044* (2006.01)
*F16K 11/07* (2006.01)

(52) U.S. Cl.
CPC .................................. *F16K 11/044* (2013.01)
USPC .............. 137/625.5; 137/625.27; 137/625.66; 137/625.17

(58) Field of Classification Search
USPC .............. 137/625.5, 625.48, 625.17, 625.25, 137/625.27, 625.66, 625.4
See application file for complete search history.

(56) References Cited

U.S. PATENT DOCUMENTS

| | | | | |
|---|---|---|---|---|
| 3,329,165 A | * | 7/1967 | Lang | 137/625.5 |
| 3,762,443 A | * | 10/1973 | Sorenson | 137/625.27 |
| 3,858,607 A | | 1/1975 | Baker | |
| 4,726,398 A | | 2/1988 | Barree | |
| 5,575,311 A | * | 11/1996 | Kingsford | 137/625.5 |
| 6,105,615 A | | 8/2000 | Goldsmith | |
| 6,575,187 B2 | * | 6/2003 | Leys et al. | 137/15.21 |
| 6,772,791 B2 | * | 8/2004 | Neff | 137/625.65 |
| 7,210,501 B2 | * | 5/2007 | Neff et al. | 137/625.65 |
| 2006/0021664 A1 | * | 2/2006 | Katsuta et al. | 137/625.65 |

OTHER PUBLICATIONS

International Search Report for PCT/US2008/066972, dated Sep. 3, 2008.
First Office Action for Chinese Application No. 200880019782.6, dated Apr. 26, 2011.

\* cited by examiner

*Primary Examiner* — John K Fristoe, Jr.
*Assistant Examiner* — David Colon Morales
(74) *Attorney, Agent, or Firm* — Marshall, Gerstein & Borun LLP

(57) ABSTRACT

A high pressure three-way control valve comprises a valve body defining first, second, and third ports disposed in selective fluid communication with each other via a control element. The control element is movable between a first seated position and a second seated position to selectively control the direction of fluid between the first and second port, or alternatively, between the first and third port. So configured, the control valve serves a function that conventionally requires two valves plumbed together.

25 Claims, 5 Drawing Sheets

FIG. 1
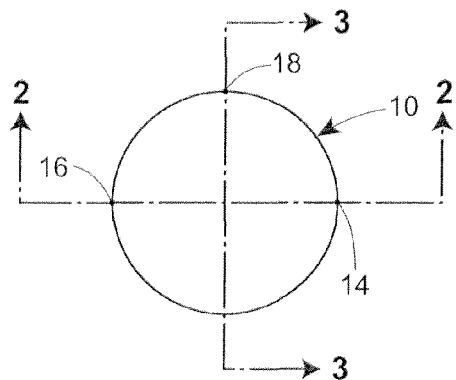
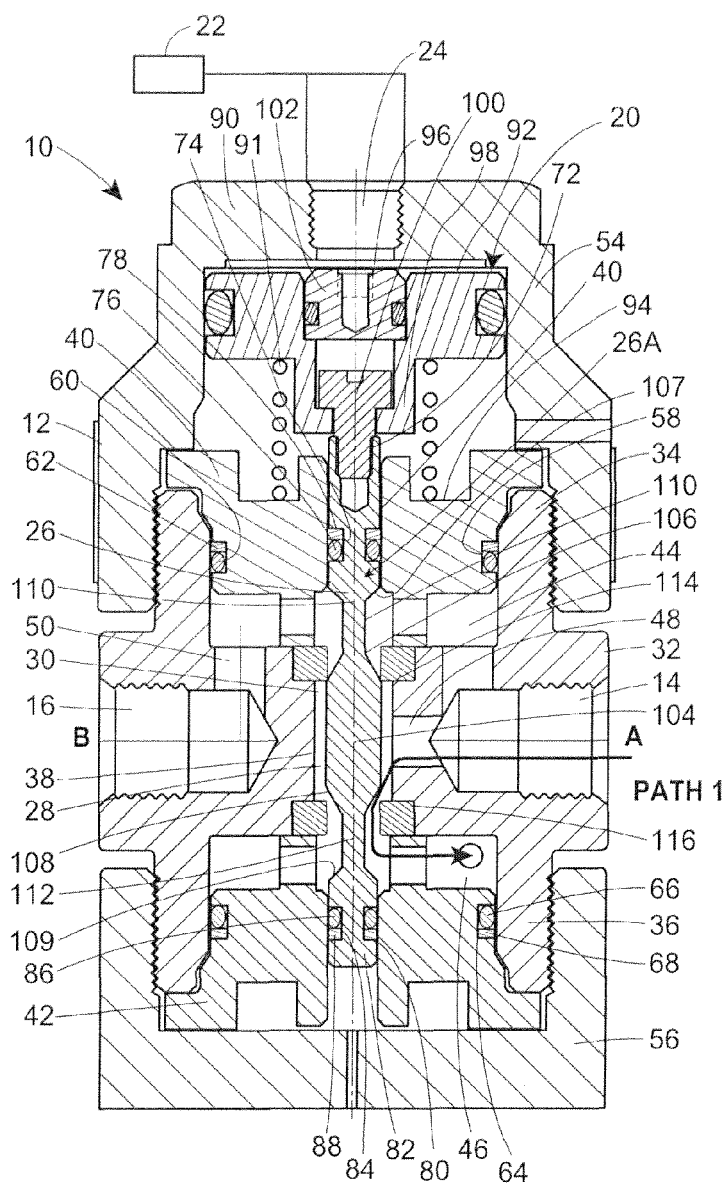
FIG. 2 ial Patent Application
3-WAY HIGH-PRESSURE AIR OPERATED VALVE

CROSS-REFERENCE TO RELATED APPLICATIONS

The priority benefit of U.S. Provisional Patent Application No. 60/944,407, filed Jun. 15, 2007 is hereby claimed, and the entire contents thereof are incorporated herein by reference.

FIELD OF THE INVENTION

The present invention generally relates to air-operated valves, and more particularly, to a high-pressure 3-way air-operated valve.

BACKGROUND

Plants and factories utilize process control devices to control the flow of fluids in processes, wherein "fluids" may include liquids, gases, or any mixture that can flow through a pipe. Manufacturing processes that create consumer articles or goods such as fuel, food, and clothes require control valves to control and regulate fluid flow. Even a medium sized factory may utilize hundreds of control valves to control a process. Control valves have been utilized for over a century, during which time valve designers have continuously improved the operational performance of control valves.

When designing a process, the designer is faced with many design requirements and design constraints. For example, some process control applications require a valve to enable flow in two directions, which are often called bi-directional flow valves. Another example of a design constraint includes the pressure at which the fluid will be operating within the process. For example, some processes operate at relatively low pressures, e.g., less than approximately 10,000 pounds per square inch gauge sig), while other processes may operate at relatively high pressures, e.g., greater than 10,000 psig, and up to approximately 20,000 psig.

In certain circumstances, a 2-way or bi-directional valve may not be sufficient to achieve the desired functionality for a selected part of the system. Accordingly, designers wishing to equip a process system with a 3-way functionality may opt to use two separate two-way or bi-directional valves plumbed together in the same system.

BRIEF DESCRIPTION OF THE DRAWINGS

FIG. 1 is a top plan schematic view of a tri-directional or 3-way air-operated control valve in accordance with the present invention and illustrating an exemplary relative location of three ports.

FIG. 2 is a cross-sectional side view of one embodiment of the 3-way air-control operated valve taken along line 2-2 of FIG. 1 and assembled in accordance with the present invention and illustrating the control element in a first position.

DETAILED DESCRIPTION

Figure 3:
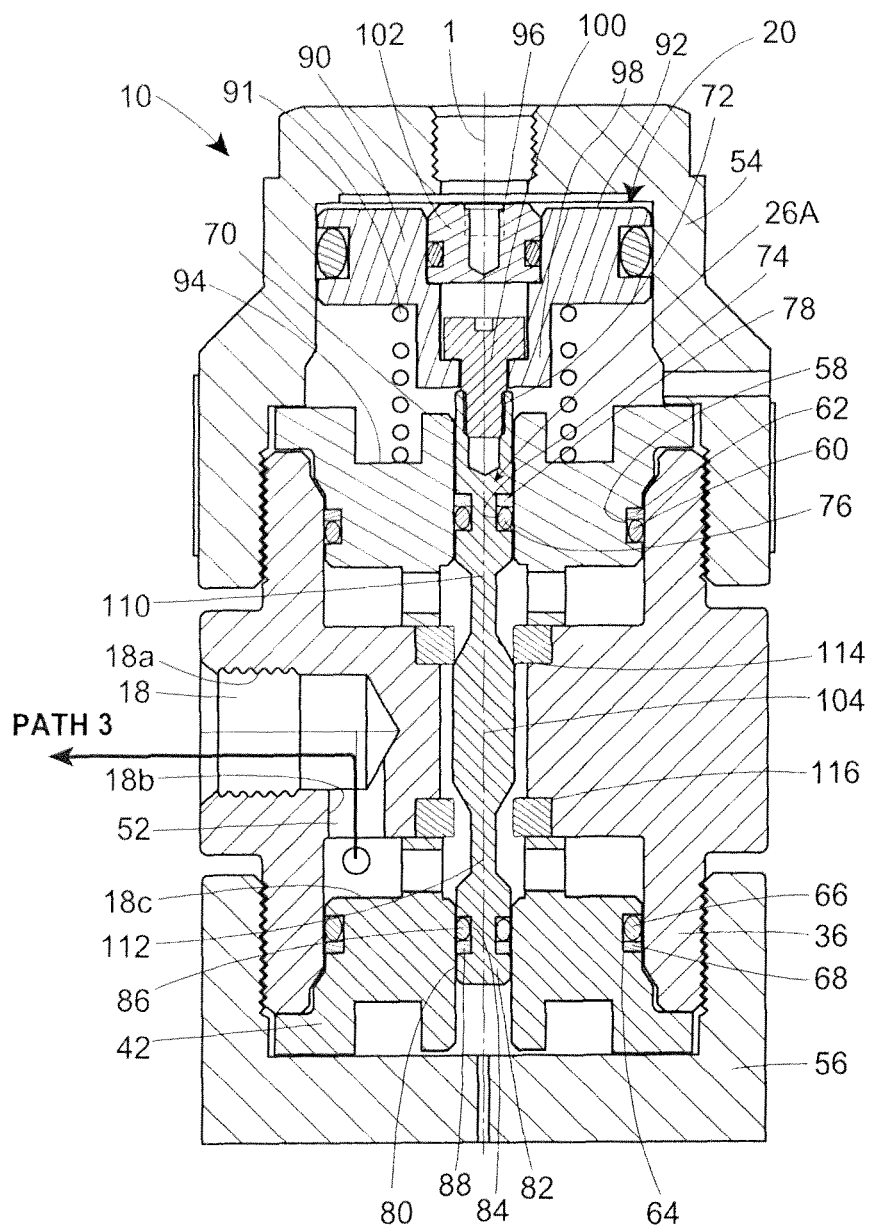
FIG. 3 is another cross-sectional side view of the 3-way air-operated control valve taken along line 3-3 of FIG. 1.

Referring now to FIGS. 1-4, an air-operated tri-directional or 3-way control valve 10 assembled in accordance with the teachings of the present invention is shown. The control valve 10 generally includes a valve body 12, first through third ports 14, 16, and 18, and an actuator assembly 20 for controlling flow through the first through third ports 14, 16, and 18 in a manner to be explained in greater detail below. One example of the relative positions of the ports 14, 16, and 18 is shown schematically in FIG. 1.

As depicted, the first port 14 is disposed perpendicular to the second port 16, the second port 16 is disposed perpendicular to the third port 18, and the first and second ports 14 and 16 are disposed one hundred and eighty degrees from each other. It will be understood that the relative positions of the ports 14, 16 and 18 may take any suitable form. The actuator assembly 20 is operated by an air supply source 22 (shown schematically in FIG. 2). The air supply source 22 is connected to a control or air supply port 24. The actuator assembly 20 includes a control element 26, which can also be referred to as a thrust pin or control poppet, that is mounted within the valve body 12. In the disclosed embodiment, the control element 26 is disposed along an axis 1 that is perpendicular to each of the ports 14, 16, 18. The control element 26 is adapted for movement or displacement along the axis I between a first position 26A illustrated in FIGS. 2 and 3 and a second position 26B illustrated in FIG. 4.

The valve body 12 includes an internal bore or throat 28, which is sized to form a gap or clearance space 30 around the control element 26. The throat 28 is adapted to be in fluid communication with each of the first through third ports 14, 16, 18. As will be explained in greater detail below, the control element 26 moves in response to pressure changes at the air supply port 24, such that the control element 26 can shift between the first and second positions.

The valve body 12 further includes a central portion or base 32 having an upper part 34 and a lower part 36, with the throat 28 being formed by a bore 38 extending through the base 32. In the disclosed example, the ports 14, 16, and 18 are formed in the base 32. More specifically, as shown in FIGS. 2 and 3, the first port 14 comprises a generally linear passageway extending through the base 32 of the valve body 12, while the second and third ports 16, 18 include turns. For example, the second port 16 includes a first portion 16a, a second portion 16b, and a third portion 16c. Similarly, the third port 18 includes a first portion 18a, a second portion 18b, and a third portion 18c. In the disclosed embodiment, the second portions 16b, 18c of the second and third ports 16, 18 are disposed perpendicular to the first and second portions 16a, 16c, 18a, 18c. Alternative embodiments, however, could be constructed differently.

Figure 4:
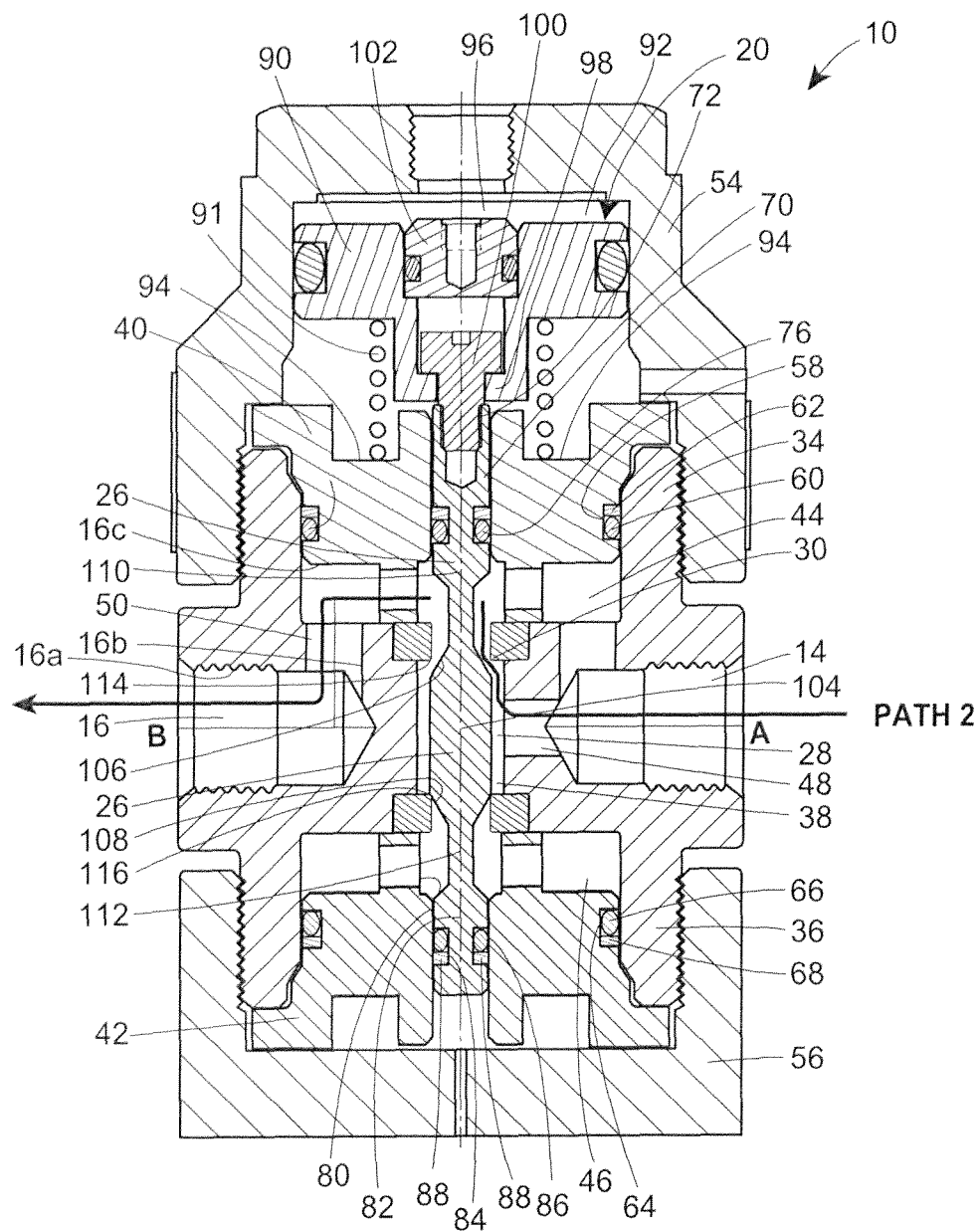
FIG. 4 is a cross-sectional side view similar to FIG. 2 and illustrating the control element in a second position.

The upper part 34 of the base 32 is sized to receive an upper valve insert 40, while the lower part 36 of the base 32 is sized to receive a lower valve insert 42. The upper valve insert 40 and the upper part 34 of the base 32 are sized to form an upper chamber 44 in the throat 28, while the lower valve insert 42 and the lower part 36 of the base 32 are sized to form a lower chamber 46 in the throat 28. Preferably, the valve inserts 40 and 42 are constructed of 316 stainless steel. The upper chamber 44 is in flow communication with the throat 28 when the control element 26 is in the lowered or second position as shown in FIG. 4, while the lower chamber 46 is in flow communication with the throat 28 when the control element 26 is in the raised or first position as shown in FIGS. 2 and 3. In the disclosed example, the first port 14 is in fluid communication with the throat 28 via a bore 48, which as described above is generally linear. The second port 16 is in fluid communication with the upper chamber 44 via a bore 50, which as described above comprises the first, second, and third portions 16a, 16b, 16c of the second port 16. Finally, the third port 18 is in fluid communication with the lower chamber 46 via a bore 52, which as described above includes the first, second, and third portions 18a, 18b, 18c of the third port 18. In accordance with the disclosed example, the first port 14 can be brought into selective fluid communication with the second port 16 by placing the control element 26 in the second position of FIG. 4, or with the third port 18 by placing the control element 26 in the first position of FIGS. 2 and 3.

The upper valve insert 40 is secured by an upper cap 54, while the lower valve insert 42 is secured by a lower cap 56. Preferably, the upper valve insert 40 includes an outer channel 58 having a seal 60 and a backup ring 62. Still preferably, the lower valve insert 42 includes an outer channel 64 having a seal 66 and a backup ring 68. The upper valve insert 40 includes a bore 70 sized to receive an upper portion 72 of the control element 26. Preferably, the upper portion 72 of the control element 26 includes a channel 74 sized to receive a seal 76 and a backup ring 78. Similarly, the lower valve insert 42 includes a bore 80 sized to receive a lower portion 82 of the control element 26. Preferably, the lower portion 82 includes a channel 84 sized to receive a seal 86 and a backup ring 88. Accordingly, the control element 26 is guided for shiftable sliding movement within the valve body 12 by the bores 70 and 80 in the respective valve inserts. The backup rings preferably include a plastic ring sized and configured to maintain the position of the corresponding seals in the appropriate channels.

In addition to the control element 26, the actuator assembly 20 includes a piston 90 slidably disposed within a piston chamber 92 formed between the upper cap 54 and an upper portion 94 of the upper valve insert 40. The piston chamber 92 is in flow communication with the air supply port 24, such that the piston 90 moves within the piston chamber 92 in response to pressure changes in a region 96 above the piston 90. A lower portion 98 of the piston 90 is coupled to the upper portion 72 of the control element 26 by any suitable coupling. In the disclosed example, an adjustable cap screw 100 disposed in a countersunk hole in the piston 90 secures the piston 90 to the control element. The cap screw 100 may be covered by a removable cover 102. As spring 91 biases the piston 90 upwardly, which in turn biases the control element 26 toward the first position of FIGS. 2 and 3.

The control element also includes a central portion 104 having a thickness or diameter which may be widened relative to the thickness or diameters of the upper and lower portions 72 and 82 of the control element 26. The central portion 104 is bounded on both ends by tapered upper and lower seating surfaces 106 and 108. The seating surfaces 106 and 108 are tapered, and further are preferably frustoconical. Each of the seating surfaces 106 and 108 transitions into a narrowed portion 110, 112, respectively. The seating surface 106 is sized and positioned to seat against an upper valve seat 114 carried by the base 32 and surrounding a portion of the throat 28, while the seating surface 108 is sized and positioned to seat against an upper valve seat 116 carried by the base 32 and surrounding a portion of the throat 28. In the disclosed embodiment, the upper valve seat 114 is disposed between first port 14 and the third portion 16c of the second port 16. Additionally, the lower valve seat 116 is disposed between the first port 14 and the third portion 18c of the third port 18. Said another way, the first port 14 communicates with the throat 28 of the valve body 12 at a location between the upper and lower valve seats 114, 116. The second port 16 communicates with the throat 28 at a location opposite the upper valve seat 114 from the first port 14. The third port 18 communicates with the throat 28 at a location opposite the lower valve seat 116 from the first port 14.

Still referring to FIGS. 2-4, the control element 26 includes another tapered portion 107 formed opposite the seating surface 106 on the other side of the narrowed portion 110. Similarly, the control element 26 includes yet another tapered portion 109 formed opposite the seating surface 108 from the narrowed portion 112. In accordance with the disclosed example, the exposed area of the seating surface 106 equals the exposed area of the tapered portion 107. Accordingly, when the control element 26 is in the first position of FIGS. 2 and 3, the pressure acting on the equal exposed areas is the same, and therefore the control element 26 is effectively balanced. When the control element 26 is in the second position of FIG. 4, once again the exposed area of the seating surface 108 equals the exposed area of the tapered portion 109. Consequently, the pressure acting on the equal exposed areas is the same.

The air supply port 24 preferably is threaded receiving a supply line (not shown) connected to a pneumatic supply. The pneumatic supply may be, for example, a source of compressed shop-air supplied at a pressure of between approximately eighty (80) psig and approximately one-hundred and fifty (150) psig. The force required to move the piston 90 is a function of the surface area of the piston 90.

Based on the foregoing, it will be appreciated that the position of the control element 26 within the control valve 10 can be controlled by introducing compressed air into the piston cavity 92. For example, in the absence of compressed air supplied to the cavity 92, the spring 91 biases the piston 90 into the raised first position depicted in FIGS. 2 and 3, which causes the seating surface 106 to sealingly engage the valve seat 114. However, the introduction of compressed air into the region above the piston increases the pressure acting on the top of the piston 90. When enough pressure is applied to overcome the biasing force of the spring 91, the piston 90 and hence the control element 26 moves downward from the position shown in FIGS. 2 and 3 to the position shown in FIG. 4. Accordingly, the seating surface 106 moves away from the seat 114, and the seating surface 108 moves into contact with the seat 116.

It will be appreciated that the ports 14, 16, 18, and the above-mentioned chambers and bores are arranged to define a first flow path designated PATH 1 (FIGS. 2 and 3) and a second flow path designated PATH 2 (FIG. 4). As shown in FIGS. 2 and 3, PATH 1 extends through the port 14, the bore 48, the throat 28, between the seating surface 108 and the lower valve seat 116 (by virtue of the fact that the control element 26 is in the raised or first position), through the lower chamber 46, through the bore 52, and through the port 18. Accordingly, at least the portions of the first flow path PATH 1 that extend through the ports 14 and 18 are disposed perpendicular to the axis 1 of the control element 26. As will be explained in greater detail below, depending on which of the ports 14, 16, 18 are pressurized, fluid may flow in different directions.

Next, when the control element 26 is shifted to the lower or second position illustrated in FIG. 4, PATH 2 extends through the port 14, the bore 48, the throat 28, between the seating surface 106 and the upper valve seat 114 (by virtue of the fact that the control element 26 is now in the lowered or second position), through the upper chamber 44, through the bore 50, and through the port 16. Accordingly, at least the portions of the second flow path PATH 2 that extend through the ports 14 and 16 are disposed perpendicular to the axis 1 of the control element 26.

In high pressure applications, however, the pressures at one or more of the ports 14, 16 or 18 may rise to between approximately 10,000 psig and approximately 20,000 psig. It will be understood that, depending on which of the ports 14, 16, 18 is under pressure, the pressure will act on one of the tapered seating surfaces 106, 108 of the control element 26, and will urge the control element 26 upward or downward.

So configured, the valve 10 of the present invention may be operated with standard compressed shop-air delivered to the region of the piston 90 via the air supply port 24 at a pressure of between approximately eighty (80) psig and one-hundred and fifty (150) psig. Because the diameter of the piston 90 provides a much larger surface area than the exposed surface are of the seating surfaces 106 or 108, the relatively low-pressure shop air is sufficient to generate sufficient force to overcome the forces of the spring 91 or any upward force caused by fluid pressure in the process system.

Figure 5A:
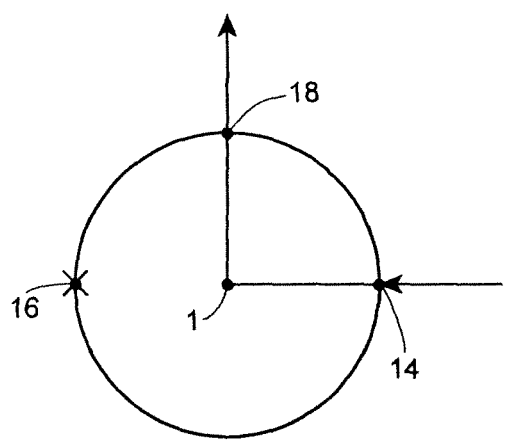
FIGS. 5A and 5B are schematic flow diagrams illustrating a first exemplary flow pattern with the control element in the first and second positions, respectively.
Figure 5B:
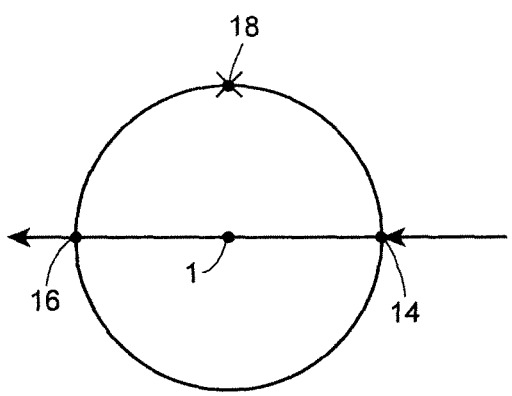

In accordance with the disclosed example, the control valve 10 may be used in the number of exemplary operational modes. A first exemplary operational mode is illustrated in FIGS. 5A (in which the control element 26 is in the first position) and 5B (in which the control element 26 is in the second position). In FIG. 5A the port 14 is pressurized such that pressure flows through the control valve 10 along the first flow path PATH 1 and exits through the port 18. Port 16 is shut off. When the control element 26 shifts to the second position, pressure flows along PATH 2 from port 14 to port 16, with port 18 being shut off.

Figure 6A:
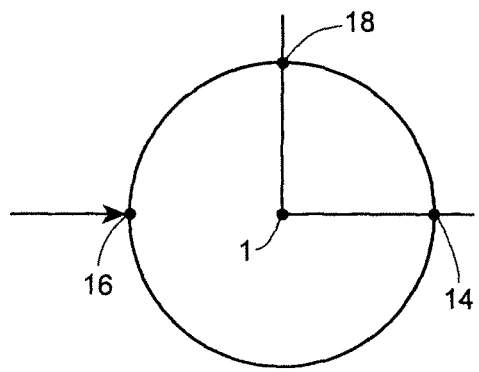
FIGS. 6A and 6B are schematic flow diagrams illustrating a second exemplary flow pattern with the control element in the first and second positions, respectively.

A second exemplary operational mode is illustrated in FIGS. 6A (in which the control element 26 is in the first position) and 6B (in which the control element 26 is in the second position). Pressure is supplied to port 16, and the control valve 10 is effectively closed, as pressure would not flow to the other two ports 14 or 18. When the control element 26 is shifted to the second position, pressure will flow along the second flow path PATH 2 and flow between ports 16 and 14. Port 18 is shut off. When the control element 26 returns to the first position, the flow is closed from port 16, but pressure in port 14 would flow into port 18. In this case, port 18 is an exhaust port for port 14.

Figure 6B:
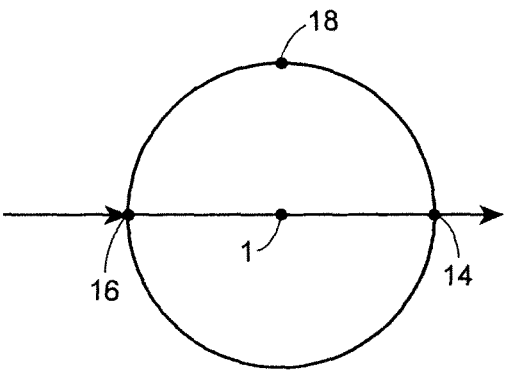
Figure 7A:
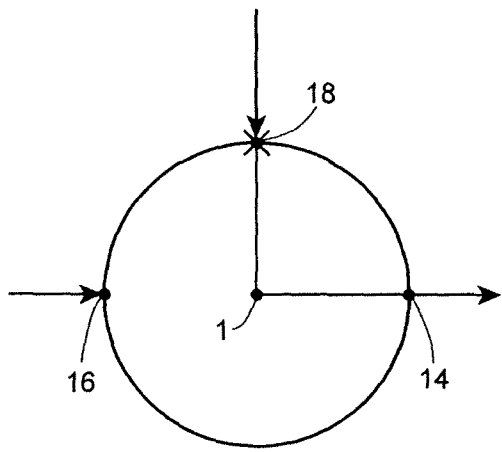
FIGS. 7A and 7B are schematic flow diagrams illustrating a third exemplary flow pattern with the control element in the first and second positions, respectively.
Figure 7B:
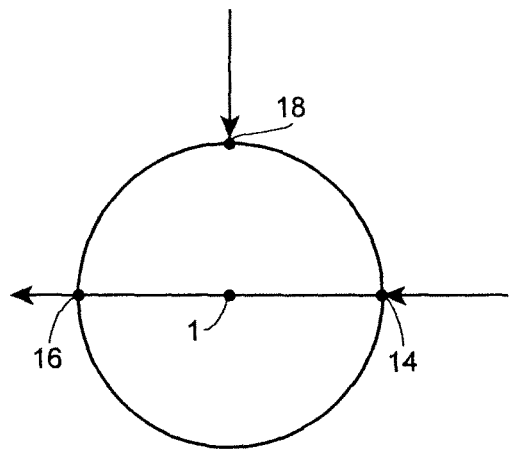

A third exemplary operational mode is illustrated in FIGS. 7A (in which the control element 26 is in the first position) and 7B (in which the control element 26 is in the second position). Pressure is applied to port 18, such that pressure flows along PATH 1 from port 18 to port 14. When the control element 26 shifts to the second position, flow is shut off to port 14 from port 18, but flow is permitted from port 14 two ports 16. In this situation, port 16 is an exhaust port for port 14. The examples of FIGS. 6A, 6B, 7A and 7B are both forms all of fill and dump valves (or exhaust three-way values). Further, the example of FIGS. 6A and 6B is a normally closed three-way valve, while the example of FIGS. 7A and 7B is a normally open three-way valve.

Figure 8A:
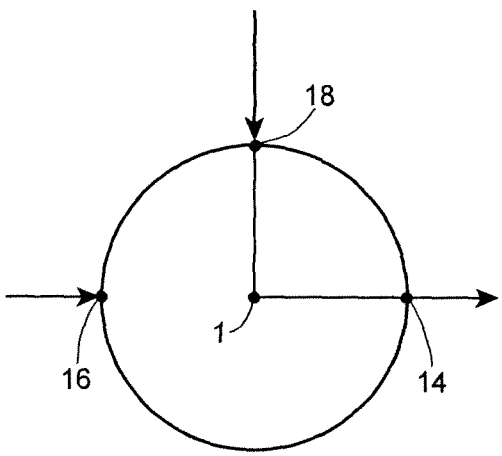
FIGS. 8A and 8B are schematic flow diagrams illustrating a fourth exemplary flow pattern with the control element in the first and second positions, respectively.
Figure 8B:
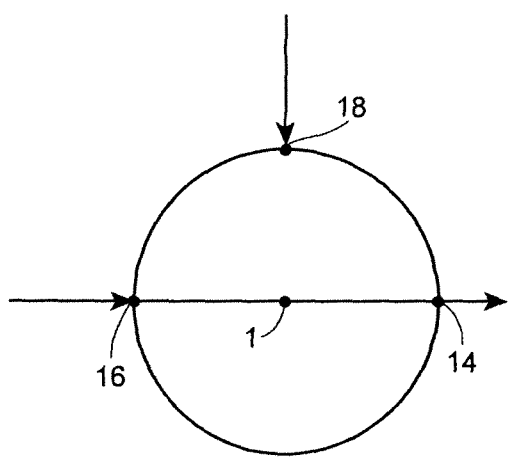

A fourth exemplary operational mode is illustrated in FIGS. 8A (in which the control element 26 is in the first position) and 8B (in which the control element 26 is in the second position). A supply is hooked up to port 16, and another supply is hooked up to port 18. When the control element 26 is in the first position, flow goes from port 18 to port 14. Port 16 is closed. When the control element 26 shifts to the second position, flow goes from port 16 to port 14. Port 18 is closed.

While each of the ports 14, 16, 18 have been disclosed herein as being perpendicular to the axis 1 of the control element 26, in alternative embodiments, one or more of the ports 14, 16, 18 can extend at generally any angle relative to the axis 1 of the control element 26.

While the present disclosure has thus far included a description of a control valve 10 for high-pressure applications, the present valve 10 may also be adapted for use in pressure applications.

In light of the foregoing, it should be appreciated that the present detailed description provides merely an example of an air-operated tri-directional control valve constructed in accordance with the principles of the present invention. Variations and modifications, including variations in the materials utilized, that do not depart from the spirit and scope of the present invention are intended to be within the scope of the appended claims.

What is claimed:

1. A high pressure fluid control device, comprising:
   a valve body defining a first port, a second port, and a third port;
   a throat disposed within the valve body and in fluid communication with each of the first, second, and third ports;
   first and second valve seats mounted in the throat of the valve body;
   a control element disposed within the throat of the valve body and having a first tapered seating surface and a second tapered seating surface, the control element movable between a first position in which the first tapered seating surface is seated against the first valve seat and a second position in which the second tapered seating surface is seated against the second valve seat;
   the first and second ports in fluid communication with one another via the throat along a second flow path when the control element is in the second position; and
   the first and third ports in fluid communication with one another via the throat along a first flow path when the control element is in the first position, and wherein the control element includes a first tapered portion formed opposite the first tapered seating surface and a second tapered portion formed opposite the second tapered seating surface, wherein an exposed area of the first tapered seating surface equals an exposed area of the first tapered portion when the control element is in the first position, and wherein an exposed area of the second tapered seating surface equals an exposed area of the second tapered portion when the control element is in the second position, allowing the control element to be balanced.

2. The device of claim 1, wherein the first, second, and third ports are disposed perpendicular to an axis along which the control element moves between the first and second positions.

3. The device of claim 1, wherein at least portions of the first and second flow paths are disposed perpendicular to an axis along which the control element moves between the first and second positions.

4. The device of claim 1, wherein the first valve seat is disposed between the first and second ports, and the second valve seat is disposed between the first and third ports.

5. The device of claim 1, wherein control element comprises a first reduced diameter portion and a second reduced diameter portion, and wherein the first tapered seating surface transitions to the first reduced diameter portion and the second tapered seating surface transitions to the second reduced diameter portion.

6. The device of claim 1, wherein the control element comprises a first reduced diameter portion and a second reduced diameter portion, and wherein the first reduced diameter portion forms part of the second flow path when the control element is in the second position, and wherein the second reduced diameter portion forms part of the first flow path when the control element is in the first position.

7. The device of claim 6, wherein the first reduced diameter portion is disposed adjacent the first tapered seating surface and the second reduced diameter portion is disposed adjacent the second tapered seating surface, and wherein the control element includes a widened portion between the first and second reduced diameter portions, and wherein the throat is sized larger than the widened portion to form a clearance space.

8. The device of claim 1, wherein the valve body includes a base sized to receive an upper valve insert secured by an upper valve cap, and a lower valve insert secured by a lower valve cap, the second flow path including an upper chamber formed between an upper portion of the base and the upper valve insert, the first flow path including a lower chamber formed between a lower portion of the base and the lower valve insert.

9. The device of claim 8, further comprising a control aperture formed in the upper valve cap and arranged for communication with an air supply source, and including a control piston disposed in a piston cavity formed in the upper valve cap, the control piston operatively coupled to the control element and arranged to shift the control element between the first and second positions in response to pressure changes in the piston cavity.

10. A high pressure fluid control device, comprising:
a valve body defining a first port, a second port, and a third port;
a throat formed within the valve body;
first and second valve seats mounted in the throat of the valve body, the first valve seat disposed between the first and second ports, the second valve seat disposed between the first and third ports; and
a control element disposed within the throat of the valve body and comprising a first tapered seating surface and a second tapered seating surface, the control element movable between a first position in which the first tapered seating surface is seated against the first valve seat and a second position in which the second tapered seating surface is seated against the second valve seat, wherein the control element and the throat are arranged to permit selective fluid communication between the first and third ports along a first flow path when the control element is in the first position, and further to permit selective fluid communication between the first and second ports along a second flow path when the control element is in the second position, and wherein
the control element includes a first tapered portion formed opposite the first tapered seating surface and a second tapered portion formed opposite the second tapered seating surface, wherein an exposed area of the first tapered seating surface equals an exposed area of the first tapered portion when the control element is in the first position, and wherein an exposed area of the second tapered seating surface equals an exposed area of the second tapered portion when the control element is in the second position, allowing the control element to be balanced.

11. The device of claim 10, wherein the first, second, and third ports are disposed perpendicular to an axis along which the control element moves between the first and second positions.

12. The device of claim 10, wherein at least portions of the first and second flow paths are disposed perpendicular to an axis along which the control element moves between the first and second positions.

13. The device of claim 10, wherein the control element comprises a first reduced diameter portion and a second reduced diameter portion, and wherein the first tapered seating surface transitions to the first reduced diameter portion and the second tapered seating surface transitions to the second reduced diameter portion.

14. The device of claim 10, wherein the control element comprises a first reduced diameter portion and a second reduced diameter portion, and wherein the first reduced diameter portion forms part of the second flow path when the control element is in the second position, and wherein the second reduced diameter portion forms part of the first flow path when the control element is in the first position.

15. The device of claim 14, wherein the first reduced diameter portion is disposed adjacent the first tapered seating surface and the second reduced diameter portion is disposed adjacent the second tapered seating surface, and wherein the control element includes a widened portion between the first and second reduced diameter portions, and wherein the throat is sized larger than the widened portion to form a clearance space.

16. The device of claim 10, wherein the valve body includes a base sized to receive an upper valve insert secured by an upper valve cap, and a lower valve insert secured by a lower valve cap, the second flow path including an upper chamber formed between an upper portion of the base and the upper valve insert, the first flow path including a lower chamber formed between a lower portion of the base and the lower valve insert.

17. The device of claim 16, further comprising a control aperture formed in the upper valve cap and arranged for communication with an air supply source, and including a control piston disposed in a piston cavity formed in the upper valve cap, the control piston operatively coupled to the control element and arranged to shift the control element between the first and second positions in response to pressure changes in the piston cavity.

18. A high pressure fluid control device, comprising:
a valve body defining a first port, a second port, and a third port;
a throat disposed within the valve body and in fluid communication with each of the first, second, and third ports;
first and second valve seats mounted in the throat of the valve body;
a control element disposed within the throat of the valve body and comprising an axis disposed perpendicular to the first, second, and third ports, the control element movable along the axis between a first position in engagement with the first valve seat and a second position in engagement with the second valve seat;
the first and third ports in fluid communication with one another via the throat along a first flow path when the control element is in the first position; and
the first and second ports in fluid communication with one another via the throat along a second flow path when the control element is in the second position, and wherein
the control element includes a first tapered portion formed opposite a first tapered seating surface and a second tapered portion formed opposite a second tapered seating surface, wherein an exposed area of the first tapered seating surface equals an exposed area of the first tapered portion when the control element is in the first position, and wherein an exposed area of the second tapered seating surface equals an exposed area of the second tapered portion when the control element is in the second position, allowing the control element to be balanced.

19. The device of claim 18, wherein at least portions of the first and second flow paths are disposed perpendicular to the axis of the control element.

20. The device of claim 18, wherein the first valve seat is disposed between the first and second ports, and the second valve seat is disposed between the first and third ports.

21. The device of claim 18, wherein the control element comprises a first reduced diameter portion and a second reduced diameter portion, and wherein the first tapered seating surface transitions to the first reduced diameter portion and the second tapered seating surface transitions to the second reduced diameter portion.

22. The device of claim 18, wherein the control element comprises a first reduced diameter portion and a second reduced diameter portion, and wherein the first reduced diameter portion forms part of the second flow path when the control element is in the second position, and wherein the second reduced diameter portion forms part of the first flow path when the control element is in the first position.

23. The device of claim 22, wherein the first reduced diameter portion is disposed adjacent the first tapered seating surface and the second reduced diameter portion is disposed adjacent the second tapered seating surface, and wherein the control element includes a widened portion between the first and second reduced diameter portions, and wherein the throat is sized larger than the widened portion to form a clearance space.

24. The device of claim 18, wherein the valve body includes a base sized to receive an upper valve insert secured by an upper valve cap, and a lower valve insert secured by a lower valve cap, the second flow path including an upper chamber formed between an upper portion of the base and the upper valve insert, the first flow path including a lower chamber formed between a lower portion of the base and the lower valve insert.

25. The device of claim 24, further comprising a control aperture formed in the upper valve cap and arranged for communication with an air supply source, and including a control piston disposed in a piston cavity formed in the upper valve cap, the control piston operatively coupled to the control element and arranged to shift the control element between the first and second positions in response to pressure changes in the piston cavity.

* * * * *

UNITED STATES PATENT AND TRADEMARK OFFICE
CERTIFICATE OF CORRECTION

Page 1 of 1

PATENT NO.        : 8,991,427 B2
APPLICATION NO.   : 12/137905
DATED             : March 31, 2015
INVENTOR(S)       : Todd W. Larsen It is certified that error appears in the above-identified patent and that said Letters Patent is hereby corrected as shown below:

In the Specification:

At Column 1, line 38, "sig)," should be -- (psig), --.

At Column 1, line 55, "air-control operated" should be -- air-operated control --.

At Column 2, line 33, "axis I" should be -- axis 1 --.

At Column 2, line 56, "18c" should be -- 18b --.

At Column 2, line 57-58, "16c, 18a, 18c." should be -- 16b, 18a, 18b. --.

At Column 3, line 66, "seat 116" should be -- seat 114 --.

At Column 5, line 58, "values)." should be -- valves). --.

Signed and Sealed this
Twenty-third Day of February, 2016

Michelle K. Lee
*Director of the United States Patent and Trademark Office*